US012562775B2

(12) United States Patent
Zhang et al.

(10) Patent No.: US 12,562,775 B2
(45) Date of Patent: Feb. 24, 2026

(54) METHOD AND APPARATUS FOR FACILITATING ANTENNA CALIBRATION

(71) Applicant: Telefonaktiebolaget LM Ericsson (publ), Stockholm (SE)

(72) Inventors: Hao Zhang, Guangzhou (CN); Ang Feng, Solna (SE); Christian Braun, Vallentuna (SE); Chen Guo, Sundbyberg (SE); Ruifang Ma, Guangzhou (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 357 days.

(21) Appl. No.: 18/025,348

(22) PCT Filed: Sep. 24, 2020

(86) PCT No.: PCT/CN2020/117393
§ 371 (c)(1),
(2) Date: Mar. 8, 2023

(87) PCT Pub. No.: WO2022/061643
PCT Pub. Date: Mar. 31, 2022

(65) Prior Publication Data
US 2023/0336207 A1 Oct. 19, 2023

(51) Int. Cl.
*H04B 1/525* (2015.01)
*H04B 17/12* (2015.01)
*H04B 17/354* (2015.01)
(52) U.S. Cl.
CPC ............. *H04B 1/525* (2013.01); *H04B 17/12* (2015.01); *H04B 17/354* (2015.01)

(58) Field of Classification Search
CPC ...................................................... H04B 1/525
See application file for complete search history.

(56) References Cited

U.S. PATENT DOCUMENTS

| | | | |
|---|---|---|---|
| 9,065,519 B2 | 6/2015 | Cyzs et al. | |
| 9,960,803 B2 | 5/2018 | Charlon | |

(Continued)

FOREIGN PATENT DOCUMENTS

| | | | |
|---|---|---|---|
| CN | 105553522 A | 5/2016 | |
| CN | 110830076 A | 2/2020 | |

(Continued)

OTHER PUBLICATIONS

International Search Report and the Written Opinion of the International Searching Authority, issued in corresponding International Application No. PCT/CN2020/117393, dated Jun. 23, 2021, 10 pages.

(Continued)

*Primary Examiner* — Yuwen Pan
(74) *Attorney, Agent, or Firm* — Rothwell, Figg, Ernst & Manbeck, P.C.

(57) ABSTRACT

The present disclosure provides a method (400) for facilitating Antenna Calibration, AC. The method (400) includes: identifying (410) a leakage signal from a signal received at an AC signal receiver and resulted from a reference signal originated from an AC signal transmitter passing through an AC signal path from the AC signal transmitter to the AC signal receiver; and cancelling (420) an influence of the leakage signal on an AC process.

18 Claims, 7 Drawing Sheets

410

Identify a leakage signal from a signal received at an AC signal receiver and resulted from a reference signal originated from an AC signal transmitter passing through an AC signal path from the AC signal transmitter to the AC signal receiver

420

Cancel an influence of the leakage signal on an AC process

400

(56) References Cited

U.S. PATENT DOCUMENTS

| | | | | | |
|---|---|---|---|---|---|
| 2006/0227040 | A1* | 10/2006 | Christian | .............. | G01S 7/4056 |
| | | | | | 342/149 |
| 2013/0064277 | A1 | 3/2013 | Liao et al. | | |
| 2017/0163295 | A1* | 6/2017 | Talty | ........................ | H03F 3/24 |
| 2022/0120850 | A1 | 4/2022 | Yeh et al. | | |

FOREIGN PATENT DOCUMENTS

| | | | |
|---|---|---|---|
| CN | 111190144 | A | 5/2020 |
| EP | 3300259 | A1 | 3/2018 |
| JP | 2017-212594 | A | 11/2017 |

OTHER PUBLICATIONS

Venkatasubramanian et al., "Geometry-Based Modeling of Self-Interference Channels for Outdoor Scenarios", IEEE Transactions On Antennas and Propagation, vol. 67, No. 5, May 1, 2019 (11 pages).

* cited by examiner

APPARATUS
1300

APPARATUS
1400

METHOD AND APPARATUS FOR FACILITATING ANTENNA CALIBRATION

CROSS REFERENCE TO RELATED APPLICATION(S)

This application is a 35 U.S.C. § 371 National Phase Entry Application from PCT/CN2020/117393, filed Sep. 24, 2020, designating the United States, the disclosure of which is incorporated herein by reference in its entirety.

TECHNICAL FIELD

The present disclosure relates to antenna technology, and more particularly, to a method and an apparatus for facilitating Antenna Calibration (AC).

BACKGROUND

In the $4^{th}$ Generation (4G) or the $5^{th}$ Generation (5G) Radio Access Network (RAN), the massive Multiple Input Multiple Output (MIMO) or Full Dimension (FD) MIMO technology is employed to enhance cell coverage, increase throughput, improve spectrum usage, etc. A large number of antennas is a key to support these technologies. In high-frequency wireless networks utilizing millimeter-wave spectrum, the number of antennas is expected to reach hundreds.

The massive MIMO or beamforming technology creates narrow beams to focus radiated energy towards a User Equipment (UE). In a Multi-User (MU) MIMO environment, multiple beams are transmitted towards UEs in order to increase the throughput. There are two key parameters to achieve good beamforming performance: number of antenna branches and AC accuracy. Current beamforming schemes presume that all antenna branches are well calibrated.

AC is used in multi-antenna radios to equalize relative phases, delays and amplitudes between multiple antenna branches. A typical coupler-based AC scheme is shown in FIG. 1. While only one radio branch is shown, it can be appreciated that more radio branches can be provided. A special AC signal, or reference signal, is transmitted from an AC signal transmitter 110. After passing through a radio chain, including Radio Transmitting (Tx)/Receiving (Rx) Hardware 120 and a Front-End Filter (FU) 130, the signal is coupled by a coupler 150 provided at or near an antenna 140 and is then received at an AC signal receiver 160. The received signal is then processed by an AC processor 170 for AC processing and compensation, such that the phase, delay, and amplitude introduced by the AC signal path can be detected, measured, and compensated. The path the signal passes from the AC signal transmitter 110 to the AC signal receiver 160 is referred to as an AC signal path herein, which may be a dedicated path or a traffic path.

Alternatively, AC can be based on Mutual Coupling (MC) measurements where some radio branches are configured to transmit a reference signal while some others are configured to receive the reference signal. Based on a large number of MC measurements, relative phases, delays and amplitudes between multiple branches in Tx/Rx directions can be calibrated. An MC-based AC scheme is shown in FIG. 2. While only one radio branch is shown, it can be appreciated that more radio branches can be provided. A special AC signal, or reference signal, is transmitted from an AC signal transmitter 210. After passing through a radio chain, including Radio Tx/Rx Hardware 221 and FU 231, the signal is transmitted via an antenna 241 and received by an antenna 242 via mutual coupling, as shown by the arrow 270. The signal finally reaches an AC signal receiver 250 after passing through a radio chain, including FU 232 and Radio Tx/Rx Hardware 222. The received signal is then processed by an AC processor 260 for AC processing and compensation, such that the phase, delay, and amplitude introduced by the AC signal path can be detected, measured, and compensated. Again, the path the signal passes from the AC signal transmitter 210 to the AC signal receiver 250 is referred to as an AC signal path herein, which may be a dedicated path or a traffic path.

Signal leakage is one of the major issues which may impact AC performance. When the reference signal pass through the AC signal path, there may be a leakage path as shown by the arrow 180 or 190 in FIG. 1, or the arrow 280 in FIG. 2. There may be an unexpected channel distortion (phase and/or amplitude) for antenna calibration measurement when there is a leakage signal combined with the reference signal, also referred to as a main signal as opposed to the leakage signal. FIG. 3 shows a channel phase response distorted with a leakage signal. Such distortion would result in AC failure as the leakage signal has a different delay than the main signal. For example, compared with the AC signal path, a leakage path may have a lower path delay in the case of internal leakage as shown by the arrow 180 in FIG. 1 or the arrow 280 in FIG. 2, or a higher delay in the case of external leakage as shown by the arrow 190 in FIG. 1. One analogue component having a fairly large delay is an FU (e.g., FU 130 in FIG. 1 and FUs 231 and 232 in FIG. 2). A typical FU group delay can be higher than 30 ns in a band center (and higher close to band edges). Accordingly, for an internal leakage occurring "before" the FU, it will have a significantly lower delay compared to the AC signal path. The leakage problem has been observed in multiple Advanced Antenna System (AAS) radios.

One possible solution to mitigate the leakage problem is to window the received signal in the time domain, thereby attenuating a leakage component that has higher or lower delay compared to the AC signal path. The windowing resolution is however limited by a time domain signal sampling rate. Further, the time domain windowing requires a short signal pulse, which would limit the effective useful signal content of the reference signal.

SUMMARY

It is an object of the present disclosure to provide a method and an apparatus for facilitating AC, e.g., by eliminating or at least mitigating the leakage problem. According to a first aspect of the present disclosure, a method for facilitating AC is provided. The method includes: identifying a leakage signal from a signal received at an AC signal receiver and resulted from a reference signal originated from an AC signal transmitter passing through an AC signal path from the AC signal transmitter to the AC signal receiver; and cancelling an influence of the leakage signal on an AC process.

In an embodiment, the operation of identifying may include: calculating a transfer function of the AC signal path; detecting from the transfer function a time delay of the leakage signal; and determining a phase and an amplitude of the leakage signal based on the time delay and the transfer function.

In an embodiment, the operation of calculating the transfer function may include: calculating an initial transfer function of the AC signal path based on the received signal and the reference signal; and selecting, from the initial transfer function, a part of subcarriers based on an effective bandwidth and a sampling rate of the received signal, to obtain the transfer function.

In an embodiment, the operation of detecting may include: calculating a Power Delay Profile (PDP) or a pseudo PDP, of the received signal based on the transfer function; detecting, from the PDP or the pseudo PDP, a peak having an amplitude higher than a threshold and lower than a highest peak of the PDP or the pseudo PDP; and obtaining a time delay associated with the peak as the time delay of the leakage signal.

In an embodiment, the PDP may be calculated using Inverse Fast Fourier Transform (IFFT).

In an embodiment, the calculated PDP may be over-sampled and the peak may be detected from the oversampled PDP.

In an embodiment, the pseudo PDP may be calculated using a Multiple Signal Classification (MUSIC) algorithm.

In an embodiment, the operation of cancelling may include: determining an influence of the leakage signal on the transfer function based on the time delay, phase, and amplitude of the leakage signal; removing the influence from the transfer function to obtain a modified transfer function; and inputting the modified transfer function to the AC process.

In an embodiment, the operation of cancelling may include: constructing a cancellation signal based on the time delay, phase, and amplitude of the leakage signal; generating a modified reference signal, as a combination of the reference signal and the cancellation signal; and transmitting the modified reference signal from the AC signal transmitter to the AC signal receiver.

In an embodiment, the method may further include: determining a time delay, phase, and amplitude of a further leakage signal resulted from the cancellation signal passing through the AC signal path; constructing a further cancellation signal based on the time delay, phase, and amplitude of the further leakage signal; generating a further modified reference signal, as a combination of the modified reference signal and the further cancellation signal; and transmitting the further modified reference signal from the AC signal transmitter to the AC signal receiver.

In an embodiment, the operations of determining the time delay, phase, and amplitude of the further leakage signal, constructing the further cancellation signal, and generating the further modified reference signal may be repeated iteratively until the time delay of the further leakage signal is larger than a Cyclic Prefix (CP), or the amplitude of the further leakage signal is smaller than a threshold.

According to a second aspect of the present disclosure, an apparatus for facilitating AC is provided. The apparatus includes: an identifying unit configured to identify a leakage signal from a signal received at an AC signal receiver and resulted from a reference signal originated from an AC signal transmitter passing through an AC signal path from the AC signal transmitter to the AC signal receiver; and a cancelling unit configured to cancel an influence of the leakage signal on an AC process.

In an embodiment, the identifying unit may be configured to: calculate a transfer function of the AC signal path; detect from the transfer function a time delay of the leakage signal; and determine a phase and an amplitude of the leakage signal based on the time delay and the transfer function.

In an embodiment, the transfer function may be calculated by: calculating an initial transfer function of the AC signal path based on the received signal and the reference signal; and selecting, from the initial transfer function, a part of subcarriers based on an effective bandwidth and a sampling rate of the received signal, to obtain the transfer function.

In an embodiment, the time delay may be detected by: calculating a PDP, or a pseudo PDP, of the received signal based on the transfer function; detecting, from the PDP or the pseudo PDP, a peak having an amplitude higher than a threshold and lower than a highest peak of the PDP or the pseudo PDP; and obtaining a time delay associated with the peak as the time delay of the leakage signal.

In an embodiment, the PDP may be calculated using IFFT.

In an embodiment, the calculated PDP may be over-sampled and the peak may be detected from the oversampled PDP.

In an embodiment, the pseudo PDP may be calculated using a MUSIC algorithm.

In an embodiment, the cancelling unit may be configured to: determine an influence of the leakage signal on the transfer function based on the time delay, phase, and amplitude of the leakage signal; remove the influence from the transfer function to obtain a modified transfer function; and input the modified transfer function to the AC process.

In an embodiment, the cancelling unit may be configured to: construct a cancellation signal based on the time delay, phase, and amplitude of the leakage signal; generate a modified reference signal, as a combination of the reference signal and the cancellation signal; and transmit the modified reference signal from the AC signal transmitter to the AC signal receiver.

In an embodiment, the cancelling unit may be further configured to: determine a time delay, phase, and amplitude of a further leakage signal resulted from the cancellation signal passing through the AC signal path; construct a further cancellation signal based on the time delay, phase, and amplitude of the further leakage signal; generate a further modified reference signal, as a combination of the modified reference signal and the further cancellation signal; and transmit the further modified reference signal from the AC signal transmitter to the AC signal receiver.

In an embodiment, the cancelling unit may be further configured to repeat determining of the time delay, phase, and amplitude of the further leakage signal, constructing of the further cancellation signal, generating of the further modified reference signal, and transmitting of the further modified reference signal iteratively until the time delay of the further leakage signal is larger than a CP, or the amplitude of the further leakage signal is smaller than a threshold.

According to a third aspect of the present disclosure, an apparatus for facilitating AC is provided. The apparatus includes a processor and a memory. The memory contains instructions executable by the processor whereby the apparatus is operative to perform the method according to the above first aspect.

According to a fourth aspect of the present disclosure, a computer readable storage medium is provided. The computer readable storage medium has computer program instructions stored thereon. The computer program instructions, when executed by a processor in an apparatus for facilitating AC, cause the apparatus to perform the method according to the above first aspect.

With the embodiments of the present disclosure, a leakage signal is identified from a signal received at an AC signal receiver as a result of a reference signal originated from an AC signal transmitter passing through an AC signal path from the AC signal transmitter to the AC signal receiver. Then, an influence of the leakage signal on an AC process is cancelled. In this way, with the influence of the leakage signal cancelled, the accuracy of the AC process, and accordingly the performance of the antenna system, can be significantly improved.

BRIEF DESCRIPTION OF THE DRAWINGS

The above and other objects, features and advantages will be more apparent from the following description of embodiments with reference to the figures, in which.

DETAILED DESCRIPTION

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 1:
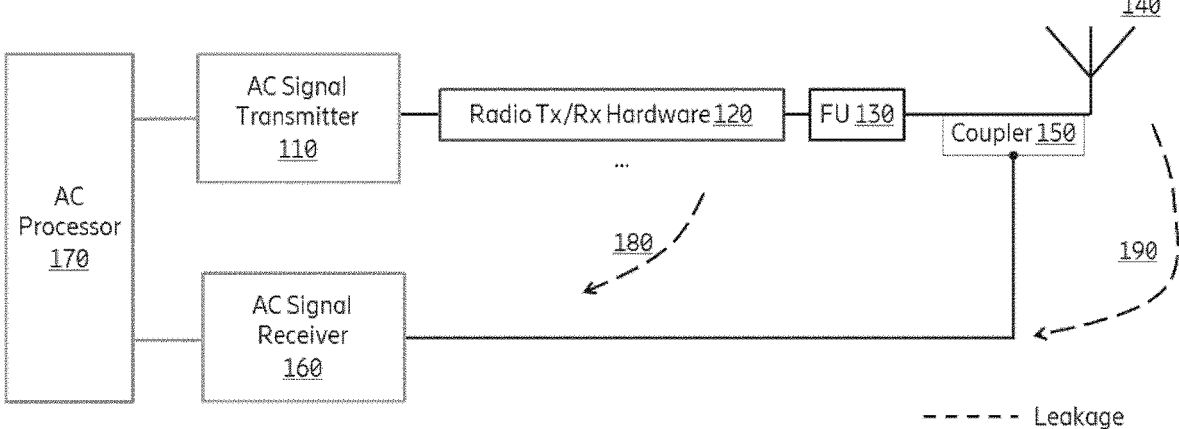
FIG. 1 is a schematic diagram showing a coupler-based AC scheme.
Figure 2:
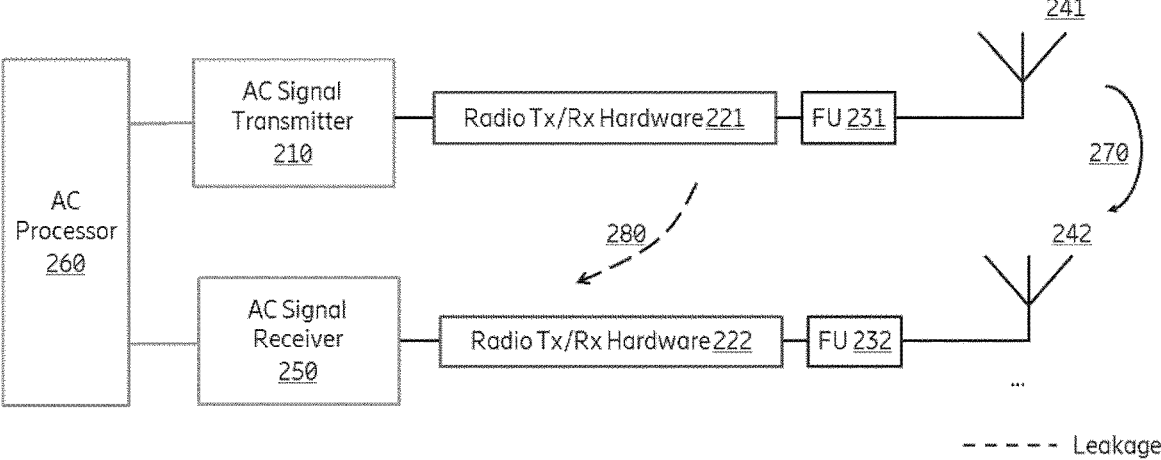
FIG. 2 is a schematic diagram showing a MC-based AC scheme.
Figure 3:
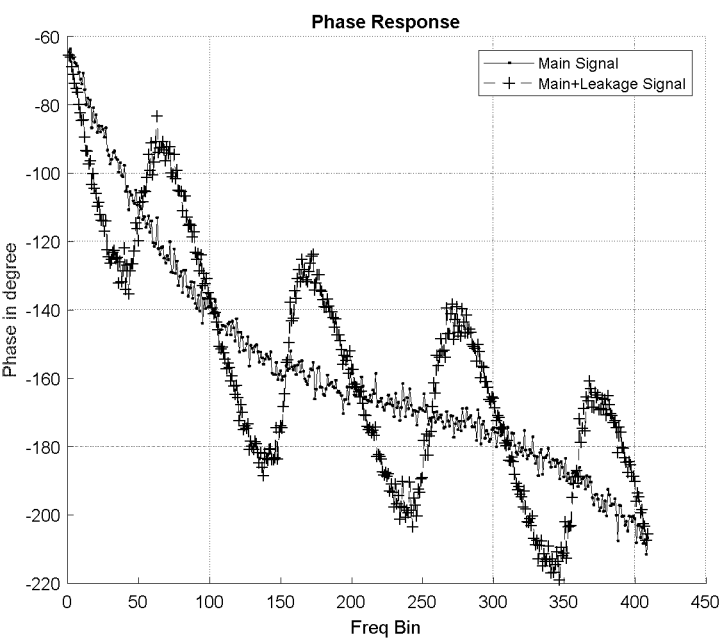
FIG. 3 is a schematic diagram showing a channel phase response distorted with a leakage signal.
Figure 4:
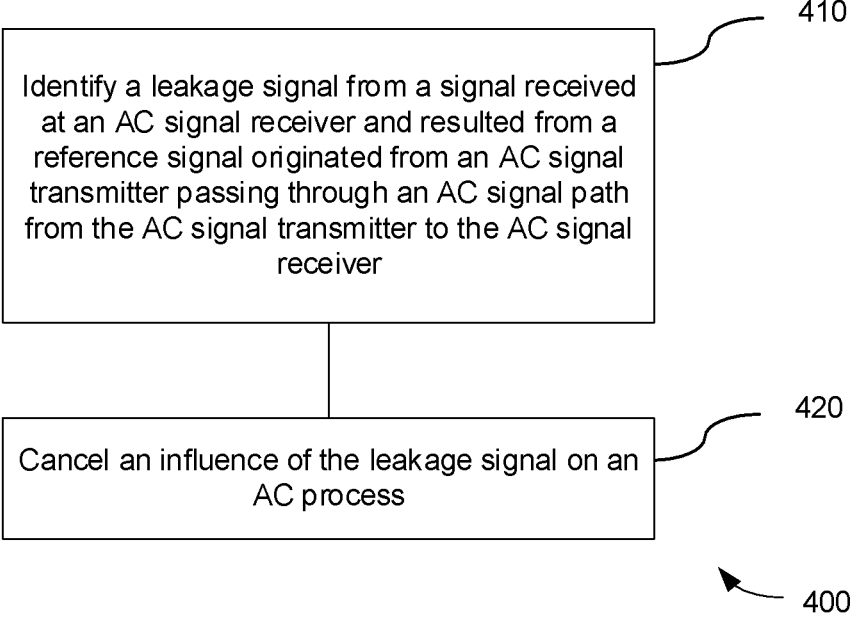
FIG. 4 is a flowchart illustrating a method for facilitating AC according to an embodiment of the present disclosure.

FIG. 4 is a flowchart illustrating a method 400 for facilitating AC according to an embodiment of the present disclosure. The method 400 can be performed at a processor, e.g., the AC processor 170 in FIG. 1 or the AC processor 260 in FIG. 2, in an antenna system, e.g., an AAS.

At block 410, a leakage signal is identified from a signal received at an AC signal receiver. The signal is resulted from a reference signal originated from an AC signal transmitter passing through an AC signal path from the AC signal transmitter to the AC signal receiver.

In an example, in the block 410, a transfer function of the AC signal path can be calculated. For example, the reference signal (or referred to as main signal) can be denoted as:

$$X=[X(0),X(1), \ldots ,X(K-1)]^T. \qquad (1)$$

The received signal can be denoted as:

$$Y=[Y(0),Y(1), \ldots ,Y(K-1)]^T. \qquad (2)$$

Here, each of $X(k')$ and $Y(k')$ represents a complex value at a subcarrier $k' \in [0, K-1]$, and K is a Fast Fourier Transform (FFT) size, or a number of frequency bins or subcarriers In an example, only a part of subcarriers can be used due to bandwidth limitation. For example, let $$X(k) = 0, \; Y(k) = 0, \; \text{for} \; -\text{floor}\left(\frac{K_{active}}{2}\right) \le k \le \text{floor}\left(\frac{K_{active}}{2}\right) \qquad (3)$$

$$\text{where} \; K_{active} = \text{floor}\left(\frac{BW}{Sr} * K\right), k = k' - \frac{K}{2},$$

denotes active subcarriers, BW denotes an effective bandwidth which equals to a total bandwidth minus a guard band, and Sr denotes a sampling rate. In this case, an initial transfer function of the AC signal path can be calculated based on the received signal and the reference signal, and a part of subcarriers can be selected from based on the effective bandwidth and the sampling rate of the received signal, to obtain the transfer function. That is, the transfer function $H=[H(0), H(1), \ldots , H(K-1)]^T$ can be calculated as:

$$H(k) = \begin{cases} \dfrac{Y(k)}{X(k)}, & -\text{floor}\left(\dfrac{K_{active}}{2}\right) \le k \le \text{floor}\left(\dfrac{K_{active}}{2}\right). \\ 0, & \text{otherwise} \end{cases} \qquad (4)$$

Figure 5:
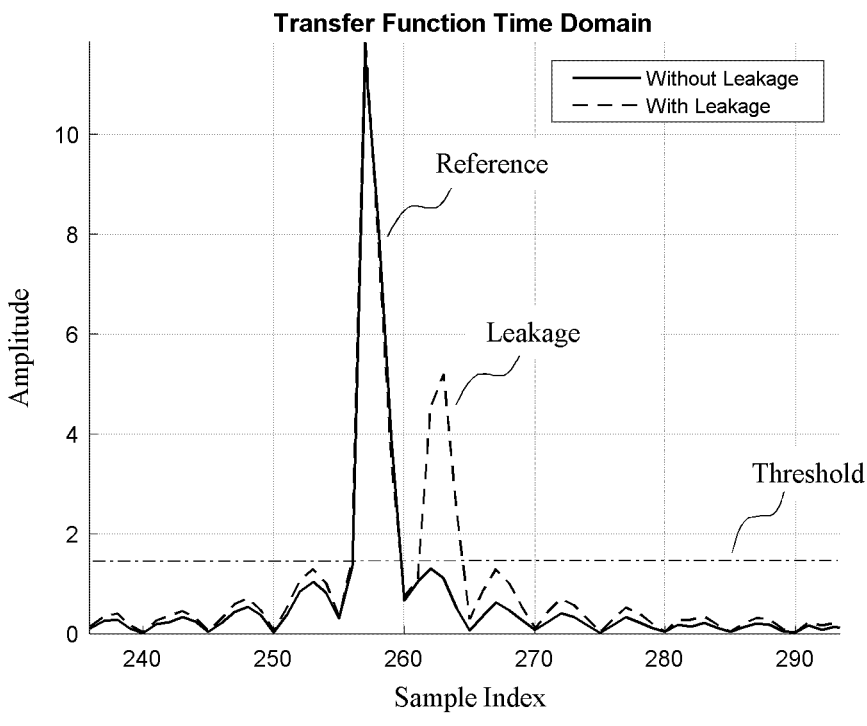
FIG. 5 is a schematic diagram showing a Power Delay Profile (PDP) from which a leakage signal can be identified.

Then, in the block 410, a time delay of the leakage signal can be detected from the transfer function. For example, a Power Delay Profile (PDP) of the received signal can be calculated based on the transfer function. Here, the PDP can be calculated using Inverse Fast Fourier Transform (IFFT) of the transfer function H. The PDP can be expressed as:

$$|h(\tau)|^2 = \left| \sum_{k=-floor(K_{active}/2)}^{floor(K_{active}/2)} H(k)e^{\frac{j2\pi k\tau}{T_s}} \right|^2 \tag{5}$$

where $\tau$ denotes the time delay, $\tau$<maxdelay, which is the maximum delay from the AC signal transmitter to the AC signal receiver, and $T_s$ is a sampling period. The time-domain location, i.e., time delay, of the leakage signal can be determined from the PDP. For example, a peak having an amplitude higher than a threshold and lower than a highest peak of the PDP can be detected from $|h(\tau)|^2$, and a time delay associated with the peak can be obtained as the time delay of the leakage signal. FIG. 5 shows an example of a PDP. As shown, the highest peak is associated with the reference signal, and the second highest peak (higher than the threshold) is associated with the leakage signal.

In an example, in order to improve the accuracy of the detection of the time delay of the leakage signal, the calculated PDP can be oversampled and the peak can be detected from the oversampled PDP. For example, the above PDP can be oversampled as:

$$|h(nT_e)|^2 = \left| \sum_{k=-floor(K_{active}/2)}^{floor(K_{active}/2)} H(k)e^{\frac{j2\pi k n T_e}{T_s}} \right|^2, n = 0, 1, \ldots , N_{max} \tag{6}$$

where $T_e$ is an oversampling period and $T_e$<$T_s$, and $N_{max}$=maxdelay/$T_e$. Similarly, a peak having an amplitude higher than a threshold and lower than a highest peak of the PDP can be detected from $|h(nT_e)|^2$, and a time delay associated with the peak can be obtained as the time delay of the leakage signal. Due to the limitation of bandwidth, the resolution of IFFT may not be good enough to identify the peak of the leakage signal that is close to the peak of the reference signal. This issue cannot be solved by simply increasing the sampling rate. In order to improve the resolution of the detection of the time delay of the leakage signal, a Multiple Signal Classification (MUSIC) algorithm can be used as an alternative. For example, a "pseudo PDP" of the received signal can be calculated based on the transfer function, e.g., using the MUSIC algorithm, in the time domain. First, a correlation matrix of the transfer function can be expressed as:

$$R = \begin{bmatrix} R(0,0) & \ldots & R(0,m) \\ \vdots & \ddots & \vdots \\ R(m,0) & \ldots & R(m,m) \end{bmatrix} \tag{7}$$

where $R(i,j)=\sum_k H(k)H(k-\delta)^*$, $\delta=i-j$, and m denotes a dimension of the correlation matrix. R is symmetric semi-definite positive matrix, whose eigenvalues and eigenvectors can be given by, using eigenvalue decomposition:

$$R=V\Sigma V^H \tag{8}$$

There are two spaces spanned with R: a signal space with larger eigenvalues/eigenvectors, and a noise space with smaller eigenvalues/eigenvectors. Specifically, V can be expressed as $[v_0 \ldots v_{m'-1} v_{m'} \ldots v_m]$, and $\Sigma$ can be expressed as diag($[\sigma_0 \ldots \sigma_{m'-1} \sigma_{m'} \ldots \sigma_m]$). According to the definition of eigenvalue decomposition, the eigenvectors $v_0 \ldots v_{m'-1}$ can span the signal space containing larger eigenvalues than a threshold, i.e., $\sigma_0 \geq \ldots \geq \sigma_{m'-1} \geq$threshold, whereas the eigenvectors $v_{m'} \ldots v_m$ can span the noise space containing smaller eigenvalues than the threshold, i.e., threshold$\geq \sigma_{m'} \geq \ldots \geq \sigma_m$. The value of m' denotes a size of signal space, which is dependent on a number of leakage signals. The value of threshold may depend on power of the leakage signals.

It is assumed here that the reference signal and the leakage signal are in the signal space. The principle of MUSIC is to calculate lengths of the vectors in the signal space with the ratio to the sum of inner products with respect to eigenvectors in the noise space, i.e.:

$$r(\tau) = \frac{1}{\sum_p |e(\tau)^H v_p|^2} \tag{9}$$

where $v_p$ is the eigenvector in the noise space, i.e., $m' \leq p \leq m$, and $e(\tau)=[1\ e^{j2\pi\tau/T_s}\ e^{j4\pi\tau/T_s}\ e^{j2\pi(m-1)\tau/T_s}]^T$ is a steering vector at the time delay of $\tau$. If $\tau$ is equivalent to the delay of the reference signal or the leakage signal, the ratio $r(\tau)$, refer to as a "pseudo PDP" in this context, will show a large value because the inner product of $e(\tau)$ and $v_p$ is close to zero. Accordingly, a peak having an amplitude higher than a threshold and lower than a highest peak of the PDP can be detected from $r(\tau)$, and a time delay associated with the peak can be obtained as the time delay of the leakage signal.

In an example, only the area where z is lower than the maximum possible delay will be calculated, which can make the MUSIC algorithm as efficient as IFFT.

Figure 6:
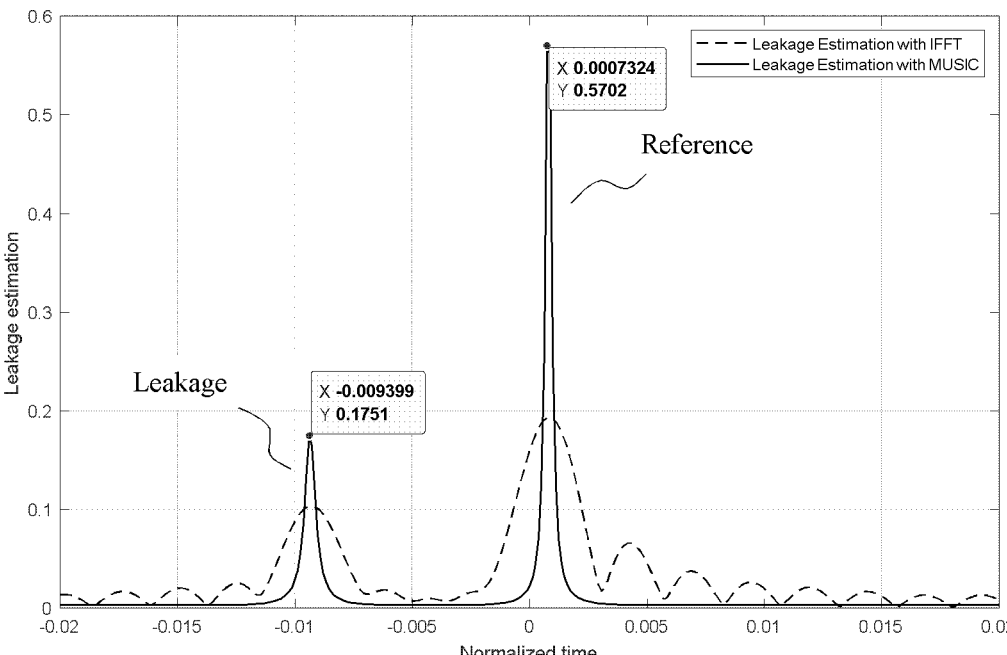
FIG. 6 is a schematic diagram showing an example of a PDP calculated using IFFT and a pseudo PDP calculated using a MUSIC algorithm.
Figure 7:
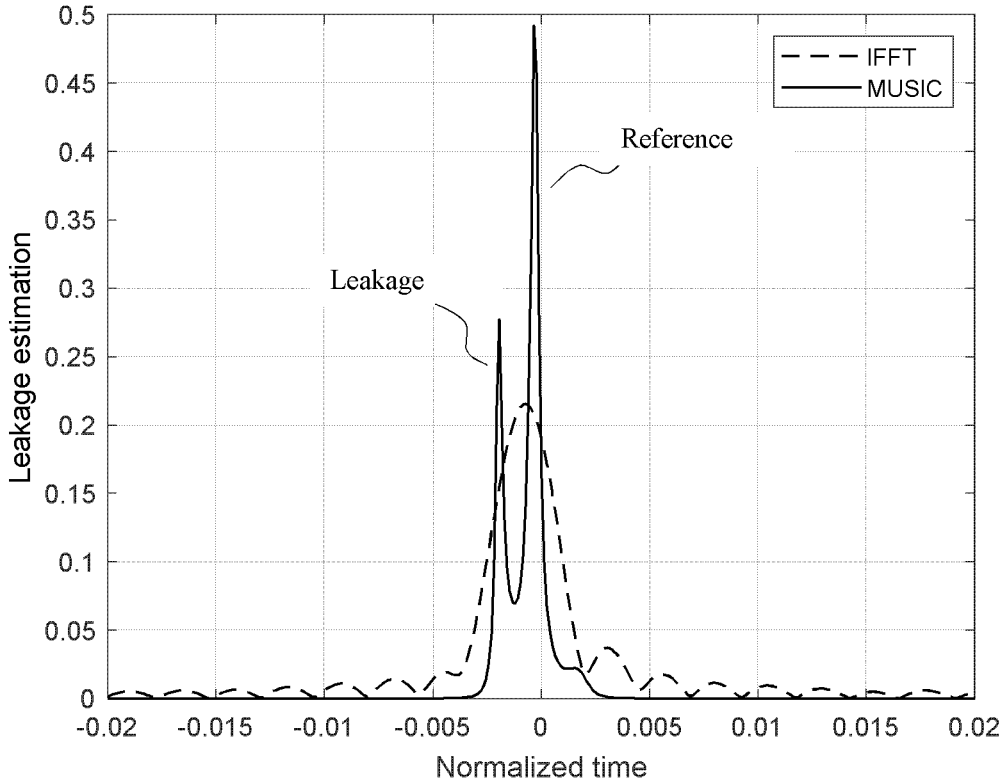
FIG. 7 is a schematic diagram showing another example of a PDP calculated using IFFT and a pseudo PDP calculated using a MUSIC algorithm.

FIG. 6 is a schematic diagram showing an example of a PDP calculated using IFFT and a pseudo PDP calculated using a MUSIC algorithm, with a 16× oversampling rate applied. It can be seen that, while the MUSIC algorithm gives a more accurate time-domain location of the leakage signal, both the IFFT and the MUSIC algorithm can identify the leakage signal. FIG. 7 is a schematic diagram showing another example of a PDP calculated using IFFT and a pseudo PDP calculated using a MUSIC algorithm. In this case, the IFFT cannot identify the leakage signal while MUSIC algorithm can (thanks to its higher resolution).

Then, in the block 410, a phase and an amplitude of the leakage signal can be determined based on the time delay and the transfer function. For example, a band-limited sinc function can be generated, with a time delay of the leakage signal denoted as $\tau_l$:

$$S=[1 e^{j2\pi\tau_l/T_s} \ldots e^{j2\pi K_{active}\tau_l/T_s} 0] \tag{10}$$

Then, the phase and the amplitude of the leakage signal can be determined as:

$$\alpha \triangleq \langle H, S \rangle = \frac{1}{K_{active}} \sum_k H(k)S(k)^* \tag{11}$$

where $\alpha$ is a complex number showing a similarity between H and S, and represents the phase and the amplitude of the leakage signal.

At block 420, an influence of the leakage signal on an AC process is cancelled. In an example, the cancellation in the block 420 can be performed in a post-cancellation scheme or a pre-cancellation scheme.

In the post-cancellation scheme, first, an influence of the leakage signal on the transfer function can be determined based on the time delay, phase, and amplitude of the leakage signal. For example, the influence can be determined as $\alpha S$. Next, the influence can be removed from the transfer function to obtain a modified transfer function, $\tilde{H}$, as:

$$\tilde{H}=H-\alpha S \tag{12}$$

Then, the modified transfer function can be inputted to the AC process for calibration and/or compensation.

Figure 8:
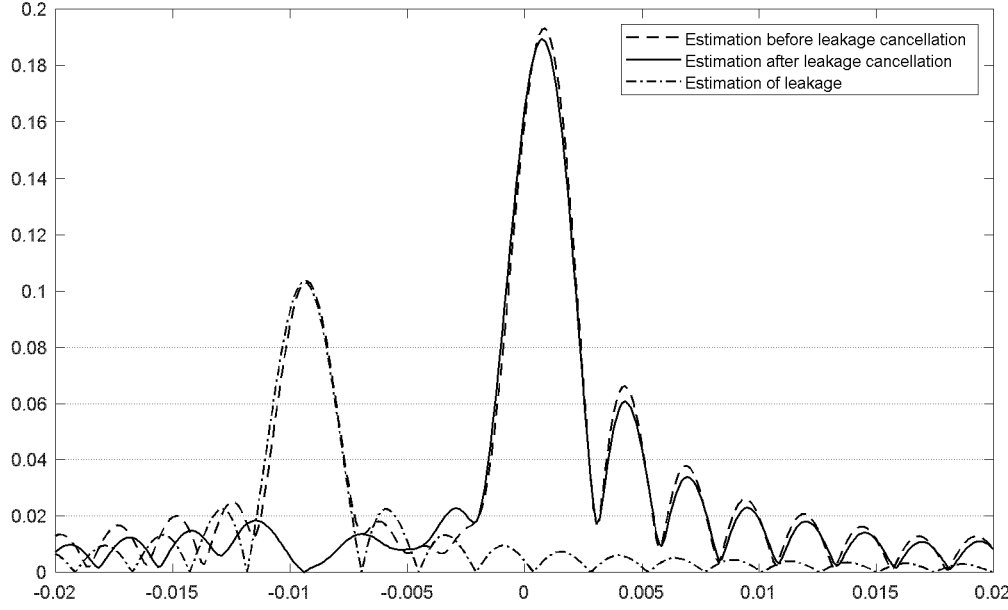
FIG. 8 is a schematic diagram showing PDPs before and after cancellation of the leakage signal according to a post-cancellation scheme.
Figure 9:
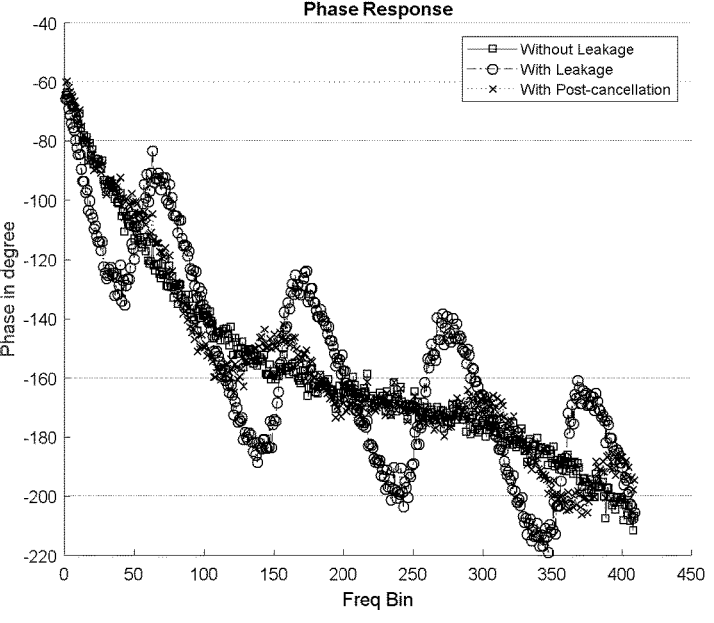
FIG. 9 is a schematic diagram showing channel phase responses with and without cancellation of the leakage signal according to a post-cancellation scheme.

FIG. 8 shows PDPs before and after cancellation of the leakage signal according to the above post-cancellation scheme, as well as the leakage signal reconstructed. It can be seen that the leakage signal is cancelled completely with this scheme. FIG. 9 shows channel phase responses with and without cancellation of the leakage signal according to the above post-cancellation scheme. It can be seen that the channel phase response with cancellation of the leakage signal is very close to that of the reference signal, meaning that the phase accuracy can be improved significantly.

In the pre-cancellation scheme, a cancellation signal can be constructed based on the time delay, phase, and amplitude of the leakage signal. Let $e(\tau_l)$ denote a vector for time shift of $\tau_l$:

$$e(\tau_l)=[1e^{j2\pi\tau_l/KT_s}e^{j4\pi\tau_l/KT_s}\ldots e^{j2n\pi\tau_l/KT_s}]^T \tag{13}$$

The cancellation signal, $S_1$, can be constructed as:

$$S_1=-\alpha X \cdot e(\tau_l) \tag{14}$$

Then, a modified reference signal can be generated as a combination of the reference signal and the cancellation signal, and can be transmitted from the AC signal transmitter to the AC signal receiver.

In an example, the cancellation signal $S_1$ may cause a further leakage signal. In order to cancel the further leakage signal, a time delay, phase, and amplitude of the further leakage signal resulted from the cancellation signal passing through the AC signal path can be determined. A further cancellation signal can be constructed based on the time delay, phase, and amplitude of the further leakage signal. A further modified reference signal can be generated as a combination of the modified reference signal and the further cancellation signal. The further modified reference signal can be transmitted from the AC signal transmitter to the AC signal receiver. The operations of determining the time delay, phase, and amplitude of the further leakage signal, constructing the further cancellation signal, and generating the further modified reference signal can be repeated iteratively until the time delay of the further leakage signal is larger than a Cyclic Prefix (CP) or the amplitude of the further leakage signal is smaller than a threshold (e.g., the above threshold shown in FIG. 5).

Figure 10:
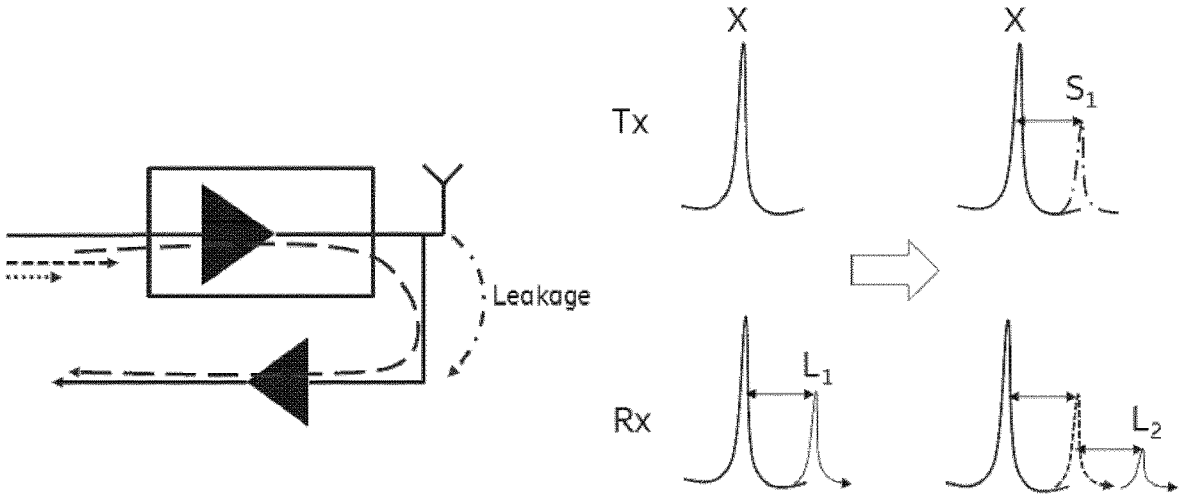
FIG. 10 is a schematic diagram showing a pre-cancellation scheme.

FIG. 10 shows the above pre-cancellation scheme. As shown, the reference signal X from the AC signal transmitter passing through the AC signal path results in a leakage signal, denoted as $L_1$, at the AC signal receiver. In this example it is assumed that the leakage signal has a higher delay than the reference signal. The cancellation signal $S_1$ can be transmitted, in combination with the reference signal X, from the AC signal transmitter to the AC signal receiver. The leakage signal $L_1$ is cancelled by the cancellation signal $S_1$. However, the cancellation signal $S_1$ passing through the AC signal path will also result in another leakage signal, denoted as $L_2$, which has a longer time delay and a smaller amplitude than $L_1$. Like $L_1$, $L_2$ can be identified. Then, a second cancellation signal, $S_2$, can be constructed and transmitted together with X and $S_1$, such that both $L_1$ and $L_2$ can be cancelled at the AC signal receiver. This process can be performed iteratively until the time delay of the leakage signal Lx is larger than a CP or the amplitude of the leakage signal Lx is smaller than a threshold.

Figure 11:
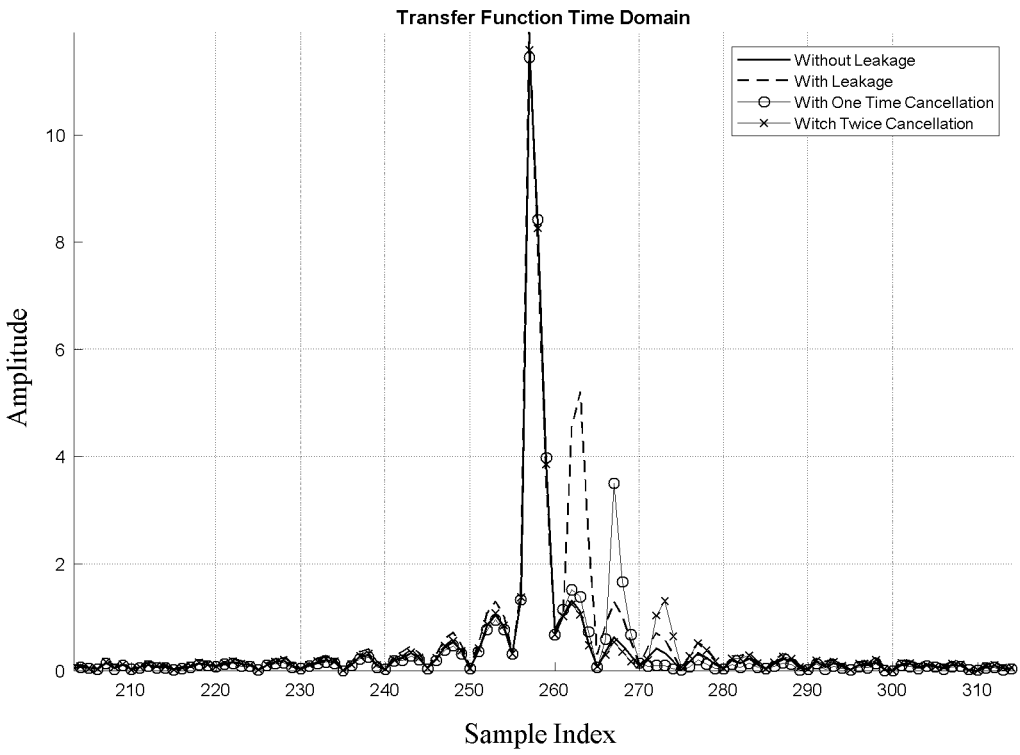
FIG. 11 is a schematic diagram showing PDPs before and after cancellation of the leakage signal according to a pre-cancellation scheme.
Figure 12:
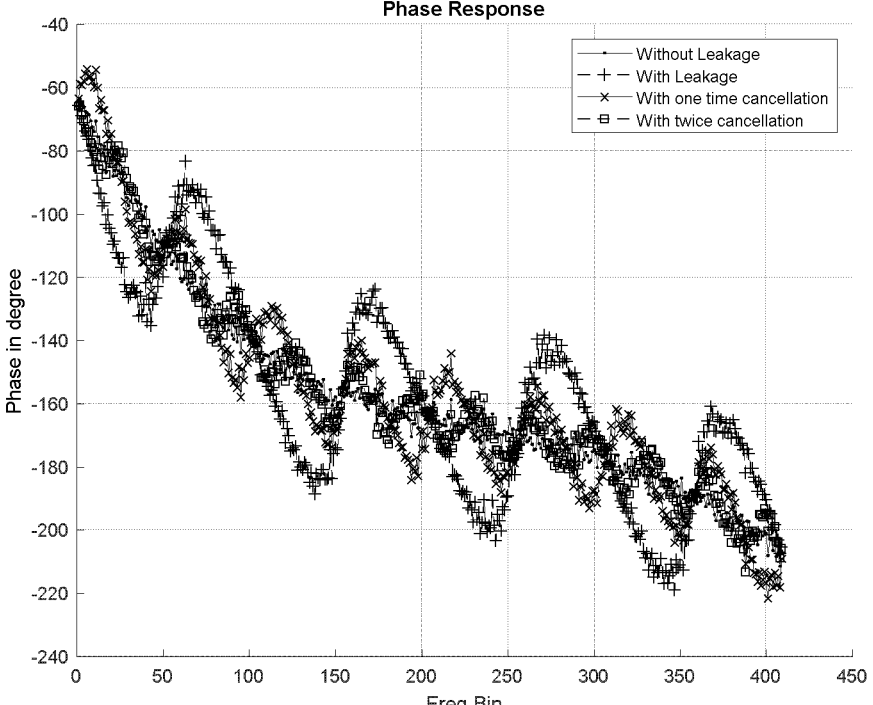
FIG. 12 is a schematic diagram showing channel phase responses with and without cancellation of the leakage signal according to a pre-cancellation scheme.

FIG. 11 shows PDPs before and after cancellation of the leakage signal according to the above pre-cancellation scheme. It can be seen that the leakage signal is cancelled substantially with this scheme. FIG. 12 shows channel phase responses with and without cancellation of the leakage signal according to the above pre-cancellation scheme. It can be seen that the phase accuracy can be improved significantly with two iterations of the pre-cancellation process.

It can be appreciated that the present disclosure is also applicable when there is more than one leakage path and thus more than one leakage signal, each having a different time delay, in the antenna system. In this case, a cancellation signal can be constructed for each of the leakage signals.

When there is more than one leakage path, the decision as to whether to use the post-cancellation scheme or the pre-cancellation scheme may depend on the delay distribution of the leakage signals. When the leakage signals originate from one single source and thus have similar time delays, or when one single leakage path is dominant, only one cancellation signal is needed. In this case, both the post-cancellation scheme and the pre-cancellation scheme are applicable. When the leakage signals have significantly different time delays, different cancellation signals will be needed for the respective leakage signals. In this case the post-cancellation scheme may be preferred.

Figure 13:
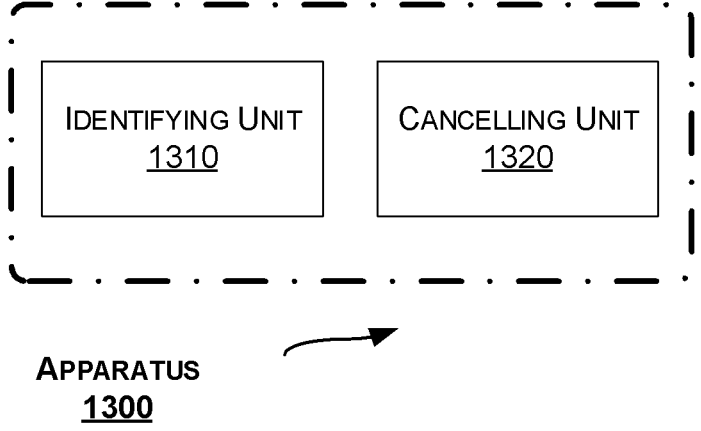
FIG. 13 is a block diagram of an apparatus for facilitating AC according to an embodiment of the present disclosure.

Correspondingly to the method 400 as described above, an apparatus for facilitating AC is provided. FIG. 13 is a block diagram of an apparatus 1300 according to an embodiment of the present disclosure. The apparatus 1300 can be, or can be implemented in, a processor, e.g., the AC processor 170 in FIG. 1 or the AC processor 260 in FIG. 2, in an antenna system, e.g., an AAS.

As shown in FIG. 13, the apparatus 1300 includes an identifying unit 1310 configured to identify a leakage signal from a signal received at an AC signal receiver and resulted from a reference signal originated from an AC signal transmitter passing through an AC signal path from the AC signal transmitter to the AC signal receiver. The apparatus 1300 further includes a cancelling unit 1320 configured to cancel an influence of the leakage signal on an AC process.

In an embodiment, the identifying unit 1310 may be configured to: calculate a transfer function of the AC signal path; detect from the transfer function a time delay of the leakage signal; and determine a phase and an amplitude of the leakage signal based on the time delay and the transfer function.

In an embodiment, the transfer function may be calculated by: calculating an initial transfer function of the AC signal path based on the received signal and the reference signal; and selecting, from the initial transfer function, a part of subcarriers based on an effective bandwidth and a sampling rate of the received signal, to obtain the transfer function.

In an embodiment, the time delay may be detected by: calculating a PDP, or a pseudo PDP, of the received signal based on the transfer function; detecting, from the PDP or the pseudo PDP, a peak having an amplitude higher than a threshold and lower than a highest peak of the PDP or the pseudo PDP; and obtaining a time delay associated with the peak as the time delay of the leakage signal.

In an embodiment, the PDP may be calculated using IFFT.

In an embodiment, the calculated PDP may be oversampled and the peak may be detected from the oversampled PDP.

In an embodiment, the pseudo PDP may be calculated using a MUSIC algorithm.

In an embodiment, the cancelling unit 1320 may be configured to: determine an influence of the leakage signal on the transfer function based on the time delay, phase, and amplitude of the leakage signal; remove the influence from the transfer function to obtain a modified transfer function; and input the modified transfer function to the AC process.

In an embodiment, the cancelling unit 1320 may be configured to: construct a cancellation signal based on the time delay, phase, and amplitude of the leakage signal; generate a modified reference signal, as a combination of the reference signal and the cancellation signal; and transmit the modified reference signal from the AC signal transmitter to the AC signal receiver.

In an embodiment, the cancelling unit 1320 may be further configured to: determine a time delay, phase, and amplitude of a further leakage signal resulted from the cancellation signal passing through the AC signal path; construct a further cancellation signal based on the time delay, phase, and amplitude of the further leakage signal; generate a further modified reference signal, as a combination of the modified reference signal and the further cancellation signal; and transmit the further modified reference signal from the AC signal transmitter to the AC signal receiver.

In an embodiment, the cancelling unit 1320 may be further configured to repeat determining of the time delay, phase, and amplitude of the further leakage signal, constructing of the further cancellation signal, generating of the further modified reference signal, and transmitting of the further modified reference signal iteratively until the time delay of the further leakage signal is larger than a CP, or the amplitude of the further leakage signal is smaller than a threshold.

The units 1310 and 1320 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 4.

Figure 14:
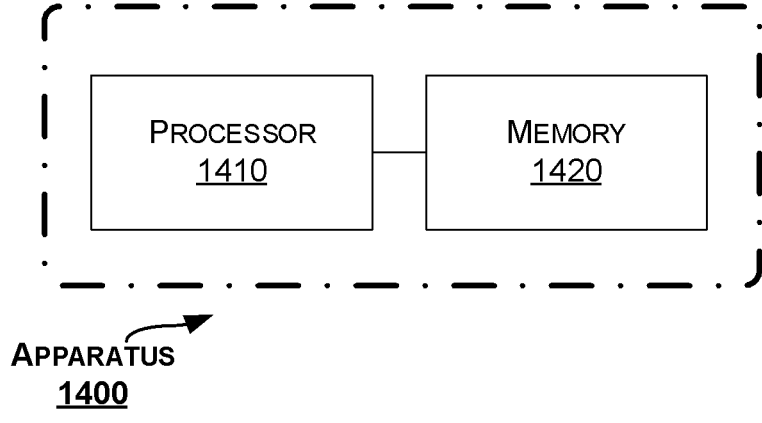
FIG. 14 is a block diagram of an apparatus for facilitating AC according to another embodiment of the present disclosure.

FIG. 14 is a block diagram of an apparatus 1400 according to another embodiment of the present disclosure. The apparatus 1400 can be, or can be implemented in, a processor, e.g., the AC processor 170 in FIG. 1 or the AC processor 260 in FIG. 2, in an antenna system, e.g., an AAS.

The apparatus 1400 includes a processor 1410 and a memory 1420. The memory 1420 may contain instructions executable by the processor 1410 whereby the apparatus 1400 is operative to perform the actions, e.g., of the procedure described earlier in conjunction with FIG. 4. Particularly, the memory 1420 may contain instructions executable by the processor 1410 whereby the apparatus 1400 is operative to identify a leakage signal from a signal received at an AC signal receiver and resulted from a reference signal originated from an AC signal transmitter passing through an AC signal path from the AC signal transmitter to the AC signal receiver; and cancel an influence of the leakage signal on an AC process.

In an embodiment, the operation of identifying may include: calculating a transfer function of the AC signal path; detecting from the transfer function a time delay of the leakage signal; and determining a phase and an amplitude of the leakage signal based on the time delay and the transfer function.

In an embodiment, the operation of calculating the transfer function may include: calculating an initial transfer function of the AC signal path based on the received signal and the reference signal; and selecting, from the initial transfer function, a part of subcarriers based on an effective bandwidth and a sampling rate of the received signal, to obtain the transfer function.

In an embodiment, the operation of detecting may include: calculating a PDP or a pseudo PDP, of the received signal based on the transfer function; detecting, from the PDP or the pseudo PDP, a peak having an amplitude higher than a threshold and lower than a highest peak of the PDP or the pseudo PDP; and obtaining a time delay associated with the peak as the time delay of the leakage signal.

In an embodiment, the PDP may be calculated using IFFT.

In an embodiment, the calculated PDP may be oversampled and the peak may be detected from the oversampled PDP.

In an embodiment, the pseudo PDP may be calculated using a MUSIC algorithm.

In an embodiment, the operation of cancelling may include: determining an influence of the leakage signal on the transfer function based on the time delay, phase, and amplitude of the leakage signal; removing the influence from the transfer function to obtain a modified transfer function; and inputting the modified transfer function to the AC process.

In an embodiment, the operation of cancelling may include: constructing a cancellation signal based on the time delay, phase, and amplitude of the leakage signal; generating a modified reference signal, as a combination of the reference signal and the cancellation signal; and transmitting the modified reference signal from the AC signal transmitter to the AC signal receiver.

In an embodiment, the memory 1420 may further contain instructions executable by the processor 1410 whereby the apparatus 1400 is operative to: determine a time delay, phase, and amplitude of a further leakage signal resulted from the cancellation signal passing through the AC signal path; construct a further cancellation signal based on the time delay, phase, and amplitude of the further leakage signal; generate a further modified reference signal, as a combination of the modified reference signal and the further cancellation signal; and transmit the further modified reference signal from the AC signal transmitter to the AC signal receiver.

In an embodiment, the operations of determining the time delay, phase, and amplitude of the further leakage signal, constructing the further cancellation signal, and generating the further modified reference signal may be repeated iteratively until the time delay of the further leakage signal is larger than a CP, or the amplitude of the further leakage signal is smaller than a threshold.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 1410 causes the apparatus 1400 to perform the actions, e.g., of the procedure described earlier in conjunction with FIG. 4.

The computer program product may be configured as a computer program code structured in computer program modules. The computer program modules could essentially perform the actions of the flow illustrated in FIG. 4.

The processor may be a single CPU (Central Processing Unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried in a computer program product connected to the processor. The computer program product may comprise a non-transitory computer readable storage medium on which the computer program is stored. For example, the computer program product may be a flash memory, a Random Access Memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method for facilitating antenna calibration (AC), the method comprising:
  identifying a leakage signal from a signal received at an AC signal receiver and resulting from a reference signal originated from an AC signal transmitter passing through an AC signal path from the AC signal transmitter to the AC signal receiver, wherein said identifying comprises:
  calculating a transfer function of the AC signal path,
  detecting from the transfer function a time delay of the leakage signal, and
  determining a phase and an amplitude of the leakage signal based on the time delay and the transfer function; and
  cancelling an influence of the leakage signal on an AC process.

2. The method of claim 1, wherein said calculating the transfer function comprises:
  calculating an initial transfer function of the AC signal path based on the received signal and the reference signal; and
  selecting, from the initial transfer function, a part of subcarriers based on an effective bandwidth and a sampling rate of the received signal, to obtain the transfer function.

3. The method of claim 1, wherein said detecting comprises:
  calculating a power delay profile (PDP) or a pseudo PDP, of the received signal based on the transfer function;
  detecting, from the PDP or the pseudo PDP, a peak having an amplitude higher than a threshold and lower than a highest peak of the PDP or the pseudo PDP; and
  obtaining a time delay associated with the peak as the time delay of the leakage signal.

4. The method of claim 3, wherein the PDP is calculated using inverse fast fourier transform (IFFT) or the pseudo PDP is calculated using a multiple signal classification (MUSIC) algorithm.

5. The method of claim 4, wherein the calculated PDP is oversampled and the peak is detected from the oversampled PDP.

6. The method of claim 1, wherein said cancelling comprises:
  determining an influence of the leakage signal on the transfer function based on the time delay, phase, and amplitude of the leakage signal;
  removing the influence from the transfer function to obtain a modified transfer function; and
  inputting the modified transfer function to the AC process.

7. The method of claim 1, wherein said cancelling comprises:
  constructing a cancellation signal based on the time delay, phase, and amplitude of the leakage signal;
  generating a modified reference signal, as a combination of the reference signal and the cancellation signal; and
  transmitting the modified reference signal from the AC signal transmitter to the AC signal receiver.

8. The method of claim 7, further comprising:
  determining a time delay, phase, and amplitude of a further leakage signal resulted from the cancellation signal passing through the AC signal path;
  constructing a further cancellation signal based on the time delay, phase, and amplitude of the further leakage signal;
  generating a further modified reference signal, as a combination of the modified reference signal and the further cancellation signal; and
  transmitting the further modified reference signal from the AC signal transmitter to the AC signal receiver.

9. The method of claim 8, wherein said determining the time delay, phase, and amplitude of the further leakage signal, constructing the further cancellation signal, and generating the further modified reference signal are repeated iteratively until the time delay of the further leakage signal is larger than a cyclic prefix (CP) or the amplitude of the further leakage signal is smaller than a threshold.

10. An apparatus for facilitating antenna calibration, AC, (AC), the apparatus comprising: a processor and a memory, the memory comprising instructions executable by the processor whereby the apparatus is operative to perform:
  identifying a leakage signal from a signal received at an AC signal receiver and resulting from a reference signal originated from an AC signal transmitter passing through an AC signal path from the AC signal transmitter to the AC signal receiver, wherein said identifying comprises:
  calculating a transfer function of the AC signal path,
  detecting from the transfer function a time delay of the leakage signal, and
  determining a phase and an amplitude of the leakage signal based on the time delay and the transfer function; and
  canceling an influence of the leakage signal on an AC process.

11. The apparatus of claim 10, wherein the transfer function is calculated by:
  calculating an initial transfer function of the AC signal path based on the received signal and the reference signal; and
  selecting, from the initial transfer function, a part of subcarriers based on an effective bandwidth and a sampling rate of the received signal, to obtain the transfer function.

12. The apparatus of claim 10, wherein the time delay is detected by:
  calculating a power delay profile (PDP) or a pseudo PDP, of the received signal based on the transfer function;

detecting, from the PDP or the pseudo PDP, a peak having an amplitude higher than a threshold and lower than a highest peak of the PDP or the pseudo PDP; and obtaining a time delay associated with the peak as the time delay of the leakage signal.

13. The apparatus of claim 12, wherein the PDP is calculated using inverse fast fourier transform (IFFT) or the pseudo PDP is calculated using a multiple signal classification (MUSIC) algorithm.

14. The apparatus of claim 13, wherein the calculated PDP is oversampled and the peak is detected from the oversampled PDP.

15. The apparatus of claim 10, wherein the apparatus is operative to perform:

determining an influence of the leakage signal on the transfer function based on the time delay, phase, and amplitude of the leakage signal;

removing the influence from the transfer function to obtain a modified transfer function; and inputting the modified transfer function to the AC process.

16. The apparatus of claim 10, wherein the apparatus is operative to perform:

constructing a cancellation signal based on the time delay, phase, and amplitude of the leakage signal;

generating a modified reference signal, as a combination of the reference signal and the cancellation signal; and transmitting the modified reference signal from the AC signal transmitter to the AC signal receiver.

17. The apparatus of claim 16, wherein the apparatus is operative to perform:

determining a time delay, phase, and amplitude of a further leakage signal resulted from the cancellation signal passing through the AC signal path;

constructing a further cancellation signal based on the time delay, phase, and amplitude of the further leakage signal;

generating a further modified reference signal, as a combination of the modified reference signal and the further cancellation signal; and transmitting the further modified reference signal from the AC signal transmitter to the AC signal receiver.

18. The apparatus of claim 17, wherein the apparatus is operative to perform repeating:

determining of the time delay, phase, and amplitude of the further leakage signal;

constructing of the further cancellation signal;

generating of the further modified reference signal and transmitting of the further modified reference signal iteratively until the time delay of the further leakage signal is larger than a cyclic prefix (CP) or the amplitude of the further leakage signal is smaller than a threshold.

* * * * *